Oct. 22, 1963   H. C. SAUER   3,107,563
APPARATUS FOR CUTTING BELT-BANDS
Filed June 8, 1960   3 Sheets-Sheet 1

INVENTOR.
HERMAN C. SAUER
BY John O. Tramontine
AGENT

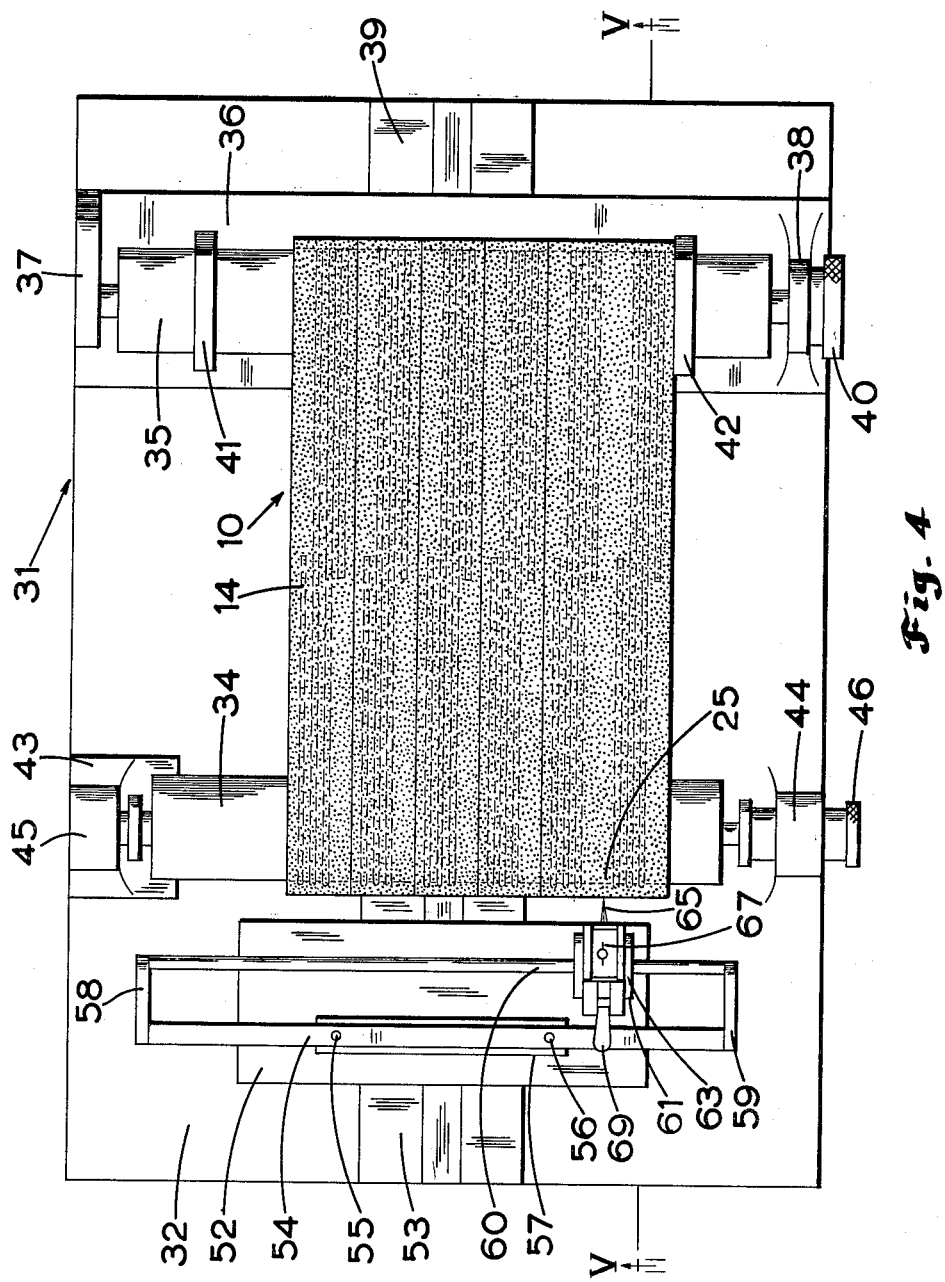

Oct. 22, 1963 H. C. SAUER 3,107,563
APPARATUS FOR CUTTING BELT-BANDS
Filed June 8, 1960 3 Sheets-Sheet 3

INVENTOR.
HERMAN C. SAUER
BY *John O. Tramontine*

AGENT

United States Patent Office 3,107,563
Patented Oct. 22, 1963

3,107,563
APPARATUS FOR CUTTING BELT-BANDS
Herman C. Sauer, Ambler, Pa., assignor to United States Rubber Company, New York, N.Y., a corporation of New Jersey
Filed June 8, 1960, Ser. No. 34,710
6 Claims. (Cl. 82—48)

This invention relates to an improved apparatus for cutting belt bands and more particularly to an improved apparatus for accurately severing a succession of belts of relatively narrow width from a belt-band of relatively wide width.

In the manufacture of flat belts, V belts and positive drive belts, it is common practice to simultaneously build up a plurality of individual belts by fabricating an endless belt-band from elastomeric material, with or without fabric material, having embedded therein a plurality of circumferentially spaced groups of reinforcing members composed of adjacent convolutions of a relatively inextensible continuous strand. The individual belts are thereafter produced by severing the band at the space between the groups of adjacent convolutions. Such a method of belt manufacture is illustrated by the disclosure of United States Patent No. 2,272,883, issued February 10, 1942.

As the groups of adjacent convolutions are embedded in the elastomeric material of the band, the space between the groups of adjacent convolutions, conventionally referred to as the "jump space," is not visible during the cutting operation. If the band is not severed at the jump spaces, the reinforcing strands in the resultant individual belts will be exposed at the edges thereof and the belts must be rejected as defective. Furthermore, even if the band is severed at the jump spaces, it will still be necessary to grind or buff the individual belts to the correct width unless the band is severed at the centerline of the jump spaces.

Accordingly, it is an object of this invention to provide an apparatus which will detect the jump space between adjacent reinforcing members which are embedded in the elastomeric material of the belt-band and thereafter sever the belt-band at this space thereby forming a plurality of individual belts having the reinforcing members totally embedded therein.

Another object of this invention is to provide apparatus which will detect the centerline of the jump space between the adjacent embedded reinforcing members and thereafter sever the belt-band at the centerline of the jump space to produce individual belts having the reinforcing members totally embedded therein and equally spaced from the sides thereof, thereby substantially eliminating any subsequent grinding or buffing operation.

It is a further object of this invention to provide an uncomplicated apparatus for achieving the above-mentioned objects of invention at a high rate of speed.

It is a further object of this invention to provide an apparatus that will accomplish the above-mentioned objects of invention regardless of the diameter of the strands of the reinforcement and regardless of variations in the width of the jump space.

Other objects and advantages of the invention will become apparent upon consideration of the following specification and claims when read in conjunction with the accompanying drawings wherein:

FIG. 4 is a top plan view of the apparatus for severing individual belts from the belt-band;

Figure 1:
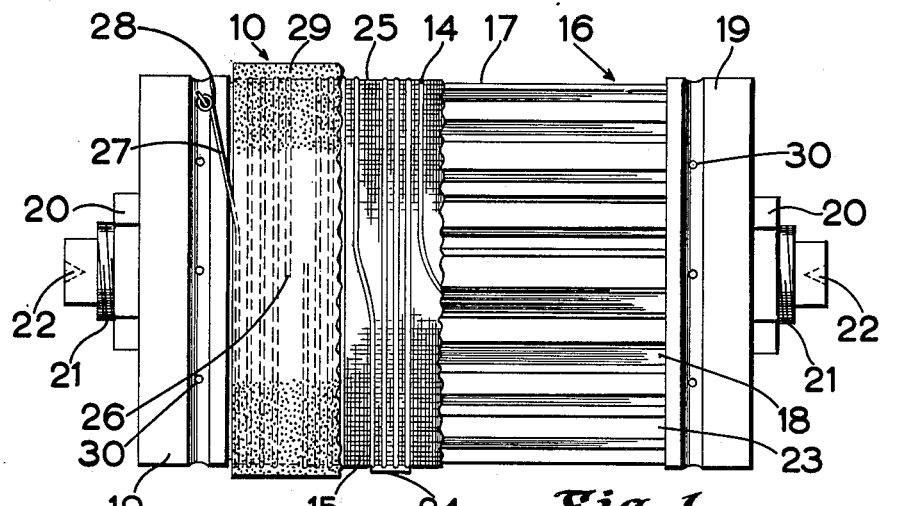
FIG. 1 is an elevational view of a belt-band built up on a belt mold in readiness for the molding operation, but showing parts of the belt broken way to better illustrate the construction thereof.
Figures 2, 3:
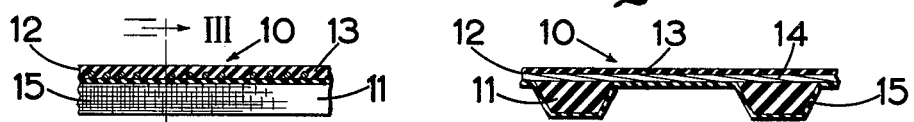
FIG. 2 is a transverse cross-sectional view of a molded positive drive belt-band.
FIG. 3 is a longitudinal cross-sectional view of the belt shown in FIG. 2 taken on line III—III of FIG. 2.

Referring to FIGS. 1, 2 and 3 of the drawings, there is illustrated a positive drive belt-band 10 comprising a plurality of resilient deformable teeth 11 which are bonded to a reinforcing member 12 of a relatively inextensible material. The resilient deformable teeth 11 and the body of the belt 13 are of an elastomeric material such as natural rubber, synthetic rubber such as polyurethane, or synthetic plastics having the properties of elastomers. The reinforcing member 12 is composed of a plurality of adjacent convolutions of a relatively inextensible continuous strand 14, which may be of a material such as prestretched cord, or wire as tension members. The term "relatively inextensible" is employed herein to designate a reinforcing member having an ultimate elongation of not more than approximately 3%. The resilient deformable teeth 11 are covered with a fabric 15 which is united to the body of the belt 13 and the reinforcing member 12 between the belt teeth 11. An example of such a positive drive belt is shown in United States Patent No. 2,507,852, issued May 16, 1950.

The elements of the belt-band 10 are built-up upon a mold 16 having a cylindrical body portion 17 provided with axially extending grooves 18 in its outer circumference constituting belt tooth cavities for the formation of the belt-band teeth 11. The body of the mold is provided with end plates 19, which are clamped to the ends of the body 17 by nuts 20 threaded into each of the ends of a spindle 21 having centering bores 22.

Prior to building the elements of the belt-band 10 upon the mold 16, the mold is placed in a conventional winding machine (not shown) and centered between the winding head and the tail stock by the entrance of centering pins of the winding machine into the centering bores 22 of the spindle 21. The mold 16 may be manually, or automatically rotated by the winding machine, which will enable the operator to apply the belt elements thereto. A plurality of belts are built upon the mold for each molding operation, and each of the elements of the several belts are applied as a unit.

Turning to FIG. 3 of the drawings, there is illustrated an exemplary method of making the above-described belt-band. The fabric covering 15 for the teeth 11 is made from a strip of stretchable fabric which is wrapped circumferentially around the mold body portion 17. Preferably, the fabric strip is impregnated with a rubber cement before being applied to the mold body portion 17. The fabric 15 extends across the grooves 18 and ridges 23, and has sufficient stretch or elongation in the portion extending over the grooves to be stretched an amount equal to the linear cross-section dimension of the sides and bottoms of the grooves 18.

The reinforcing members 12 for the several belts are formed on the mold by automatically winding a continuous strand 14 under constant tension helically over and across the fabric sleeve 15 on the mold 16. The continuous strand is wound so as to form a plurality of reinforcing member groups 24 which are axially spaced by jump spaces 25. Each of the groups 24 form the reinforcing member 12 for an individual belt. The jump space 25 is formed either by applying the wire on a machine which has a so-called jump space mechanism, which is the method illustrated in FIG. 1 of the drawings, or by applying the strand in equally spaced convolutions and thereafter removing several of strands to form the space separating the groups 24. It is advisable to wind the continuous strand 14 forming the reinforcing member groups 24 in adjacent convolutions with a small amount of space between each convolution so as to insure satisfactory adhesion and to permit unrestricted flow of the elastomeric material between said convolutions during the molding operation so as to form the teeth 11. Preferably, the strand in the jump spaces 25 is removed before the molding and cutting operation. As shown in FIG. 1, the strand in the first left-hand jump space has been cut at the midpoint thereof and laid alongside the adjacent strand in the convolution as shown at 26. As shown in FIG. 1, the starting end 27 of the strand 14 is secured with a knot on its end in a groove 28 in the left end plate 19.

The elastomeric layer 29 is applied over the convolutions of the strand 14 in the form of a sheet of sufficient thickness to provide for the teeth 11 and the body of the belt 13. Thereafter, the belt band 10 is shaped and cured in a mold (not shown) wherein sufficient pressure is exerted on the elastomeric layer 29 to cause the same to flow between the convolutions of the strand 14 thereby stretching the fabric 15 forcing it into the grooves 18 of the body portion of the mold 17 to form the teeth 11. Radial passages 30 are provided in the end plates 19 so as to permit the escape of any entrapped gases during the molding and curing operation. After the belt-band has been cured, it is removed from the mold 16 by first removing one of the end plates 19 and stripping the band axially from the mold.

Further details of the method of building up the elements of the belt-band and molding the same may be had by reference to copending application Serial No. 795,547, filed February 25, 1959, and copending application Serial No. 795,548, filed on February 25, 1959, both of which are entitled Method of Molding Positive Drive Belts.

The present invention is not restricted to any particular belt-band construction or type of belt and is equally applicable to flat belts and V belts in which case the belt-bands may be severed without removing the same from the mold. The present invention is broadly applicable to any type of elastomeric belt-band having embedded therein a plurality of axially spaced groups of reinforcing members.

Figure 5:
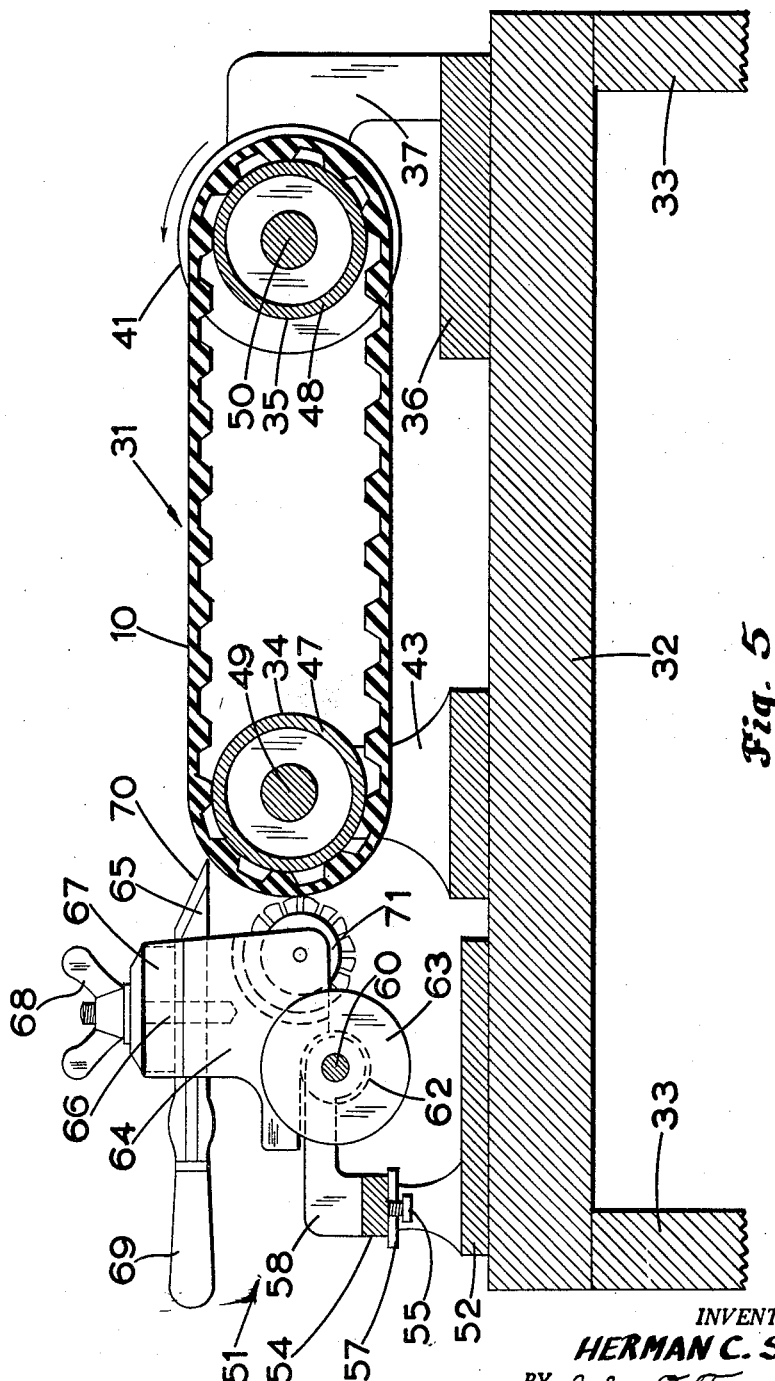
FIG. 5 is a vertical cross-sectional view of the apparatus shown in FIG. 4 taken on line V—V of FIG. 4.

After the belt-band 10 has been stripped from the mold 16, it is severed into individual belts by the apparatus of the instant invention. Referring to FIGS. 4 and 5 of the drawings, the cutting apparatus 31 comprises a table 32 supported by vertical members 33 on which is mounted a horizontal stationary spindle 34 and a horizontal adjustable spindle 35. The adjustable spindle 35 is supported above base head 36 by side brackets 37, 38. The base head member 36 is movable longitudinally of the table 32 along table channel 39. The end of the adjustable spindle 35 mounted in side bracket 38 can be released from retaining mechanism (not shown) by rotating the release hub 40. Right and left cylindrical guide collars 41, 42 are mounted concentric with adjustable spindle 35 and fixed thereto.

The horizontal stationary spindle 34 is supported above the table 32 by spindle supports 43, 44. The end of the stationary spindle 34 supported by spindle support 43 is driven in rotation by motor 45. The other end of the stationary spindle 34 mounted in spindle support 44 can be released from retaining mechanism (not shown) by turning release hub 46. Both the stationary spindle 34 and the adjustable spindle 35 are mounted for rotation, the latter being the driven spindle, and have an outer cylindrical shell, 47 and 48 respectively, supported on rotatable rods, 49 and 50 respectively.

The belt-band 10 is placed over stationary spindle 34 and adjustalbe spindle 35 with its rotary axis in a horizontal plane. The base head member 36 is then moved rearwardly along table channel 39 to place the band 10 under tension. The stationary spindle 34 is then driven by motor 45 to cause the belt-band 10 to rotate at a relatively high rate of speed in the direction shown by the arrow in FIG. 5. An outer edge of the band 10 is cut so that the band will rotate smoothly with an edge thereof contiguous to either right guide collar 41 or left guide collar 42. A plurality of individual belts are subsequently formed by a cutting mechanism 51 which severs the belt-band 10 at the jump spaces 25 successively towards the edge of the band which is contiguous to one of the guide collars 41, 42.

The cutting mechanism 51 is supported on a head block 52 which is movable longitudinally of the table 32 along table channel 53 so that belt-bands of varying thickness may be cut on the same apparatus. A horizontal support bar 54 is secured to the head block 52 by a pair of threaded bolts 55, 56 which extend through slots in a cross member 57. Extending from the ends of support bar 54 are a pair of brackets 58, 59, which support a guide rod 60. The guide rod 60 is positioned with its axis parallel to the rotary axis of the belt-band 10. A carriage 61 is mounted on guide rod 60 by means of a ball bushing whereby the carriage 61 is free to rotate and reciprocate relative to the guide rod 60. The carriage 61 has a tubular sleeve 62 coaxial with the guide rod 60 and a pair of laterally spaced circular end plates 63 rigidly connected by the tubular sleeve 62. The housing 64 of the cutting assembly is carried between the end plates 63 and rests on the sleeve 62.

The housing 64 of the cutting assembly carries a cutter 65 which fits through a slot in a fixed threaded bolt 66. The cutter 65 is securely held in place by a top block 67 which is slotted along the bottom to receive the upper edge of the cutter blade. The fixed threaded bolt 66 extends through a vertical opening in the top block 67 and a wing-nut 68 is threaded down on the bolt to hold the top block 67 in place. The outer end of the cutter 65 is fitted into a handle 69 so the operator can move the cutting assembly in a plane perpendicular to the rotary axis of the belt-band 10. The cutting edge 70 of the cutter 65 is positioned transverse to the rotary axis of the belt-band 10. A guide wheel 71 is carried by the housing 64 of the cutting assembly beneath the cutter 65 with the periphery of the guide wheel 71 in vertical alignment with the cutting edge 70. The guide wheel 71 is mounted on ball bearings for rotation about an axis parallel to the rotary axis of the belt-band 10.

In operation, the cutting mechanism 51 is positioned adjacent to the rotating belt-band 10 by moving the head block 52 along table channel 53. The operator then tilts the housing 64 of the cutting assembly forward by means of handle 69 to bring the guide wheel 71 into engagement with the rotating belt-band 10. The carriage 61 is then moved along guide rod 60 until the guide wheel 71 locates the jump space 25. When the guide wheel 71 locates the jump space 25, it will move forward a slight amount whereupon the operator moves or tilts the housing 64 of the cutting assembly forward to bring the cutter 65 into engagement with the rotating belt-band 10 to thereby sever the same at the jump space 25. As the individual belts will be severed at the jump space, the reinforcing members will be totally embedded therein. As the carriage 61 is mounted on a ball bushing for reciprocation along the guide rod 60, the guide wheel 71 will follow the jump space freely even if the belt-band 10, with one edge trimmed off, travels sideways on the spindles 34, 35.

Figure 6:
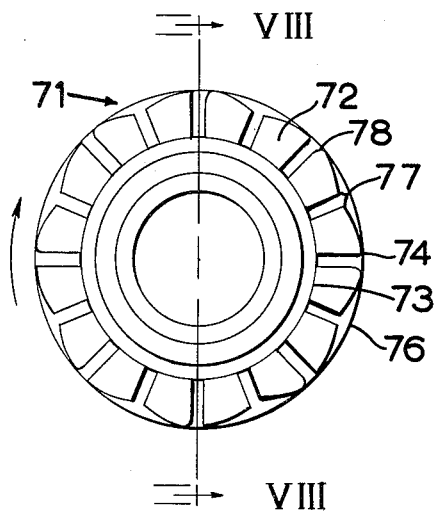
FIG. 6 is a side elevational view of the guide wheel of the instant invention.
Figures 7, 8:
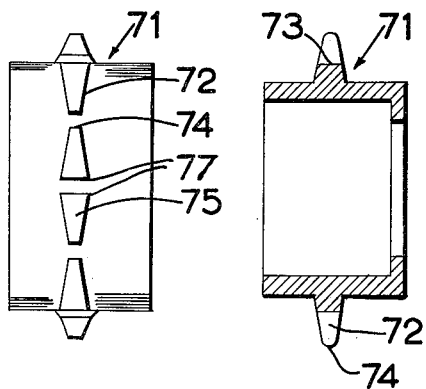
FIG. 7 is a radial plan view of the guide wheel shown in FIG. 6.
FIG. 8 is a diametrical cross-sectional view of the guide wheel shown in FIG. 6 taken on line VIII—VIII of FIG. 6.

The guide wheel 71 is shown in detail in FIGS. 6, 7 and 8. A plurality of teeth 72 are spaced on the periphery of the guide wheel 71. The teeth 72 improve the traction of the guide wheel 71 in engaging the rotating belt-band 10 but more importantly prevent the guide wheel 71 from "running-out" or losing the jump space 25 once it has located it. If the periphery of the guide wheel were smooth, the wheel would initially move into the jump space but thereafter the elastomeric material of the belt-band would build up in front of the wheel forcing the same out of the jump space. The spaces between the teeth 72 accommodate the elastomeric material which tends to build up in front of the guide wheel 71 when it is depressed into the elastomeric material at the jump space 25.

The teeth 72 of the guide wheel 71 taper in radial cross-section as shown in FIG. 8 so as to converge outwardly from the root cylinder 73 of the teeth. The root cylinder or circle 73 is that cylinder or circle which contains the bottom of the spaces between the teeth 72, as shown in FIG. 6. Each of the teeth 72 have one axial edge 74 of the top land 75 on the outside cylinder 76 of the teeth. The top land 75 is the surface of the top of the tooth, as shown in FIG. 7, whereas the outside cylinder or circle 76 is that cylinder or circle which contains the outermost points of the teeth 72, as shown in FIG. 6. The surface of the top land 75 is drafted from the axial edge 74 on the outside cylinder 76 to the other axial edge 77 of the top land 75 so that the other axial edge 77 is within the outside cylinder 76 of the teeth, whereby the top land has a generally trapezoidal surface the base of which is at the other axial edge 77, as shown in FIG. 7. The guide wheel 71, having teeth 72 constructed in this manner, will not only locate the jump space 25 with the narrow surface portion of the teeth 72, but will also center itself in the jump space as the narrow surface portion of the teeth 72 will penetrate or push into the elastomeric material of the belt-band 10 at the jump space 25 until a wider surface portion of the teeth 72 engages the belt-band 10. As the cutting edge 70 of the cutter 65 is aligned with the teeth 72 on the periphery of the guide wheel 71, the cutter 65 will sever the belt-band 10 at the centerline of the jump space 25, whereby the individual belts so severed will have the reinforcing members not only totally embedded therein but also equally spaced from the sides thereof. Furthermore, a guide wheel having teeth constructed in this manner can be employed in the cutting assembly regardless of the width of the jump space so long as the width does not exceed the width of the axial edge 77, of the size of the reinforcing strands, or of variations in the width of individual belts. In the absence of a guide wheel having teeth constructed in this manner, the operator would be left to estimate what size guide wheel should be employed for each different belt-band. Finally, the operation of the guide wheel is not affected by the inaccuracy of the strand winding machine.

The teeth 72 of the guide wheel 71 are constructed with the other axial edge 77 of the top land 75 of each tooth being directly opposite to the other axial edge 77 of the top land 75 of an adjacent tooth, as shown in FIGS. 6 and 7 of the drawings. This construction enables the wider surface portions of the teeth to be more effective in centering the guide wheel in the jump space as well as enabling the narrow surface portions of the teeth to be more effective in locating the jump space. It would be possible in such a construction to eliminate some of the spaces between the teeth 72 as the area of the teeth 72 where other axial edges 77 are directly opposed is within the outside cylinder 76 of the teeth 72 whereby such area by itself aids in accommodating the elastomeric material of the belt-band which tends to build up in front of the guide wheel 71.

It is preferred to round the axial edge 74 of the top land 75 in the outside cylinder 76 on every tooth which has such edge as the rearward edge of the tooth in the direction of rotation of the guide wheel 71, as shown in FIG. 6 at 78. The rounded axial edge 78 allows the elastomeric material of the belt-band 10, which tends to build up in front of the guide wheel, to enter the space between the teeth more easily than if the axial edge were sharp.

While the invention has been shown and described in a certain preferred form, it is to be understood that various changes and modfications may be made therein by one skilled in the art without departing from the principle of the invention, the scope of which is to be determined by the appended claims.

Having thus described my invention, what I claim and desire to protect by Letters Patent is:

1. Apparatus for cutting a plurality of individual belts from an endless elastomeric belt-band having embedded therein a plurality of axially spaced groups of reinforcing members, said members being composed of adjacent convolutions of a relatively inextensible continuous strand, comprising support means, belt-band rotating means mounted on said support means and having a rotary axis about which said belt-band may be mounted for rotation, a cutting assembly on said support means adjacent said rotating means and mounted for movement in a plane substantially perpendicular to said rotary axis and in a plane substantially parallel to said rotary axis, said assembly comprising a cutter having a cutting edge and a guide wheel having a plurality of teeth spaced on the periphery thereof, said cutting edge and said periphery being disposed in a single plane substantially perpendicular to said rotary axis, said guide wheel being mounted for rotation about an axis substantially parallel to said rotary axis, and means operable, upon being actuated, for moving said cutting assembly to first bring said wheel into engagement with said belt-band to locate the approximate centerline of a space between the groups of adjacent convolutions and to thereafter bring said cutter into engagement with said belt-band to sever said belt-band at said centerline, thereby forming a plurality of individual belts having reinforcing members totally embedded therein.

2. The apparatus of claim 1 wherein said rotary axis is in a substantially horizontal plane, a guide rod is supported by said support means substantially parallel to said rotary axis, a carriage is mounted on said rod for reciprocal movement relative to said rod, and the cutting assembly is carried by said carriage with said guide wheel vertically aligned with and beneath said cutting edge in a plane substantially perpendicular to said rotary axis.

3. The apparatus as defined in claim 2 wherein said carriage has a tubular sleeve coaxial with said guide rod and laterally spaced end plates rigidly connected by said sleeve between which said cutting assembly is carried.

4. Apparatus for cutting a plurality of individual belts from an endless elastomeric belt-band having embedded therein a plurality of axially spaced groups of reinforcing members, said members being composed of adjacent convolutions of a relatively inextensible continuous strand, comprising support means, belt-band rotating means mounted on said support means and having a rotary axis about which said belt-band may be mounted for rotation, a cutting assembly on said support means adjacent said rotating means and mounted for movement in a plane substantially perpendicular to said rotary axis and in a plane substantially parallel to said rotary axis, said assembly comprising a cutter having a cutting edge transverse to said rotary axis and a guide wheel having a plurality of teeth spaced on the periphery thereof with said periphery in alignment with said cutting edge, said guide wheel being mounted for rotation about an axis substantially parallel to said rotary axis, the teeth of said wheel being tapered in radial cross-section so as to converge outwardly from the root cylinder of the teeth, each of said teeth having one axial edge of the top land on the outside cylinder of the teeth with the surface of the top land being drafted from said one axial edge to the other axial edge of the top land whereby said other axial edge is within the outside cylinder of the teeth and the top land has a generally trapezoidal surface the base of which is at said other axial edge, and means operable upon being actuated for moving said cutting assembly to first bring said guide wheel into engagement with said belt-band to locate the approximate centerline of the space between the groups of adjacent convolutions and to thereafter bring the cutter into engagement with the belt-band to sever the same at said centerline, thereby forming a plurality of individual belts having reinforcing members totally embedded therein and equally spaced from the sides thereof.

5. The apparatus of claim 4 wherein the said other axial edge of the top land of each tooth is directly opposite the said other axial edge of the top land of an adjacent tooth.

6. Apparatus as defined in claim 5 wherein the said one axial edge of the top land is rounded on every tooth which has such edge as the rearward edge of the tooth in the direction of rotation of the guide wheel.

References Cited in the file of this patent

UNITED STATES PATENTS

| | | |
|---|---|---|
| 261,359 | Kellogg | July 18, 1882 |
| 1,600,726 | Freeman | Sept. 21, 1926 |
| 2,325,002 | Allen et al. | July 20, 1943 |
| 2,748,642 | Pirkner | June 5, 1956 |